Patented Oct. 29, 1940

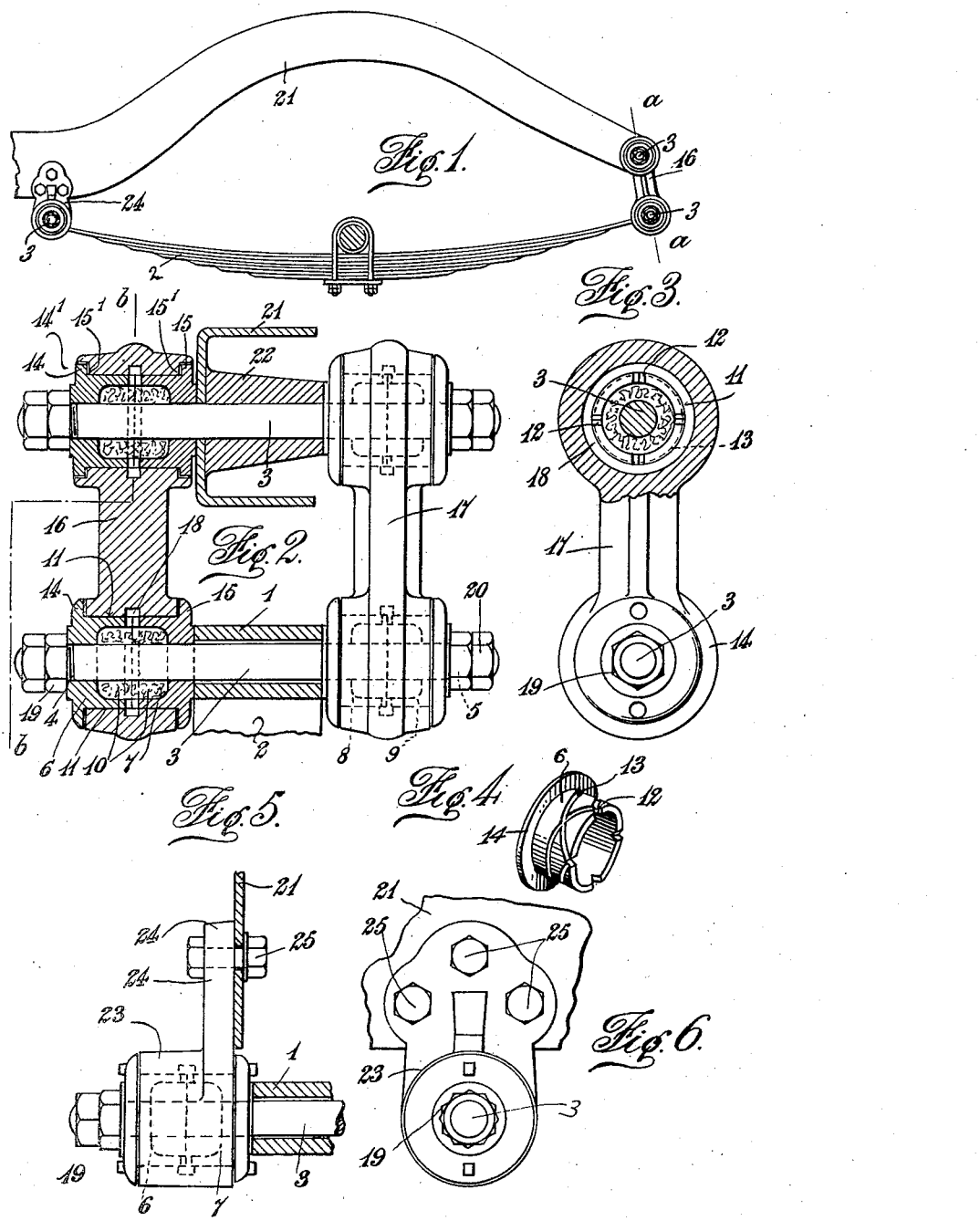

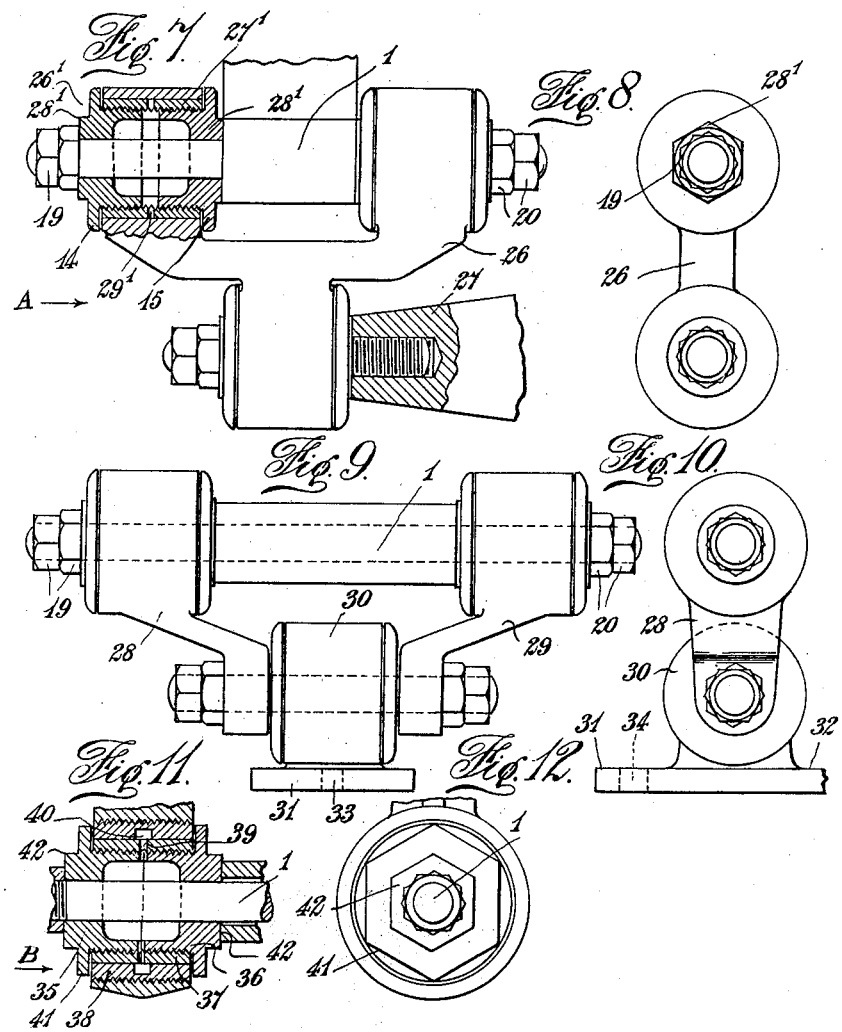

2,219,625

UNITED STATES PATENT OFFICE 2,219,625

BEARING AND THE LUBRICATION THEREOF

Alfred Henry Hilliard, Hove, England

Application April 11, 1938, Serial No. 201,438
In Great Britain April 15, 1937

11 Claims. (Cl. 308—120)

This invention relates to improvements in or relating to bearings and the lubrication thereof. The invention will be described for convenience as applied to bearings for vehicle springs but its application to other pivotal mountings will be readily understood.

In the mounting or fixing of vehicle springs it is usual to provide an eye at either end of the top plate of the spring. Accommodated in each eye is a bolt which is connected either to an intermediate shackle or directly to the chassis of the vehicle as the case may be. The eye and the portion of the bolt housed therein may be considered as constituting a bearing, as each spring, when in action, will cause each eye to oscillate slightly about its associated bolt. This form of bearing is unsatisfactory, when employed in the mounting of vehicle springs, as it provides an inadequate bearing surface which has to be frequently lubricated and during the process of lubrication dirt and grit are often injected into the parts causing considerable wear. Also during the washing of the car much of the lubricant is washed out and in wet weather moisture collects with the result that sooner or later rust is caused. This gives rise to noise and squeaking.

The object of the present invention is to provide a bearing having none of these disadvantages but which, having been charged with lubricant, will require little or no attention.

According to the present invention I provide a bearing for use in the direct or indirect attachment of a spring to a vehicle, the said bearing comprising a pair of aligned bearing members rigidly attached to the eye of the spring, or to the chassis of the vehicle, or clamped between oppositely disposed shackles; a bolt coincident with the axis of said bearing members to effect their rigid attachment to the said spring, vehicle or oppositely disposed shackles; a shackle, bracket or like connecting member provided with a bore in which the bearing members are journalled and laterally extending flanges on each of the bearing members co-acting with the said shackle or bracket to limit relative axial movement between the bearing members and shackle or bracket in which they are journalled.

Heretofore it has been proposed in connection with axle swivels to provide bearings in each arm of the stub axle, and to form the upper bearing by extending the swivel pin and rigidly mounting on the extension thus formed a sleeve which is journalled in a bush housed in a bore provided in the upper arm of the stub axle. The sleeve is bored for a portion of its length in order to provide a receptacle for oil.

In order that the said invention may be clearly understood and readily carried into effect, the same will now be described more fully, by way of example, with reference to a vehicle spring and to the accompanying drawings, in which:

Figure 1 is a side elevation of a rear spring of a motor vehicle showing an adaptation of the invention.

Figure 2 is a central transverse sectional view, partly in section and drawn to an enlarged scale, on the line a—a of Figure 1.

Figure 3 is a view taken on the line b—b of Figure 2.

Figure 4 is a perspective view of a bearing member showing the lubrication grooves.

Figures 5 and 6 are side and front views respectively of a bearing according to the present invention adapted for attachment to the chassis of a motor vehicle.

Figure 7 is a plan view of a modified form of bearing partly in section and

Figure 8 is an end view thereof taken in the direction of the arrow A.

Figures 9 and 10 are side and end views respectively showing a further modified form of bearing.

Figure 11 is an axial sectional view showing a modified form of bearing according to the present invention in which provision is made for the axial adjustment of the bearing members.

Figure 12 is an end view of Figure 11 in the direction of the arrow B.

The invention will be described with particular reference to the shackle connection of a rear spring to the chassis of a motor vehicle as shown in Figure 1. From this description adaptations of the device to suit special requirements will be readily understood. In carrying the invention into effect the usual eye 1, Figure 2, of a motor vehicle spring 2 is provided with a shackle pin or bolt 3 of slightly less diameter than that of the eye. The length of the shackle pin 3 is such that portions will extend on either side of the eye. Each projecting portion is provided with a screw thread 4, 5. Mounted on each extending portion is a pair of bearing members 6, 7, 8 and 9. Each bearing member is preferably of hollow cylindrical formation, thus providing an interior recess 10, which serves as a reservoir for a lubricant. In order that the lubricant may pass to bearing surfaces 11, notches 12, shown more particularly in Figure 4, may be provided on the abutting ends of the bearing members. Each bearing surface may be suitably grooved as at 13 in order to effect the distribution of the lubricant. Laterally extending flanges 14, 15, may be formed with, or provided on, each bearing member to effect the retention of the lubricant. In an alternative construction, shown at 14', Figure 2, the flanges 14, 15 are housed each in an annular recess 15' formed on either side of the bearing. It will be obvious that in this arrangement the lubricant will not only be retained, but dirt and grit will be effectively excluded from the bearing. Each pair of bearing members may be considered, conveniently, as composing a single bearing disposed on either side of the eye of the spring. Each bearing thus formed is journalled in shackles 16, 17. The shackles may conveniently comprise castings or forgings each formed with a boss at either end and bored to form housings for the bearings. The bosses are connected by a web of suitable cross section. A slight clearance is allowed in the lateral fitting of the bearing in order to avoid unnecessary friction. Preferably, at a central position of each bore is an annular groove 18 which serves as a further reservoir for the lubricant. The flanges 14, 15 also serve to limit relative lateral movement between the bearing members and the shackle.

It will be apparent from the foregoing description that when the parts of the bearing are assembled with the spring and clamped together by nuts 19, 20, the whole will be clamped tightly to the eye 1 and that the slight oscillatory motion of the eye, due to the alterations in the length of the spring, which occur in action, will be transmitted to the bearings on each side of the spring, and that no relative motion will occur between the bolt and the eye.

The attachment of the shackles to the chassis 21 of the vehicle is effected in a similar manner to that described in connection with the spring. It is however necessary to provide a boss or distance piece 22 on the chassis in order to correctly space the shackles. A convenient form of bracket for the direct attachment of a spring to the chassis and embodying the bearing described is shown in Figures 5 and 6. The fitment comprises a boss 23 having a lug 24 which is bolted to the chassis by means of bolts 25. The bearing is similar to that already described. It will be understood that a similar fitment is disposed oppositely to the bracket shown and that the eye of the spring is clamped between the fittings.

Figures 7 and 8 show a modified arrangement which may be employed in lieu of the fitment shown in Figure 2. The shackles in this case are superseded by a Y-shaped link 26 which is pivotally attached to a boss 27 on the chassis by a bearing similar to that already described.

Alternatively, the bearing construction shown at 26' may be employed. It will be apparent that it is desirable that the side clearance of the bearing members, referred to in connection with the construction shown in Figures 2 and 3, should be adjustable, in order that any wear may be taken up. This may be effected by threading the bearing members into a sleeve 27' the peripheral surface of which provides a bearing surface. It will be apparent that by suitably rotating one, or both, of the bearing members, for example, by means of a hexagonal boss 28' formed integral with each bearing member and engaging one or both bosses by a suitable tool, the lateral adjustment of the bearing may be effected. If desired, one bearing member only may be in threaded engagement with the sleeve which arrangement will also serve to effect the lateral adjustment of the bearing. In order to provide for the lubrication of the bearing, the sleeve 27' may be provided with one or more than one port or ports 29' to permit of the lubricant reaching the bearing surface from the reservoir. The peripheral surface of the sleeve may be grooved in a suitable manner that will permit of the travel of the lubricant. It will be obvious that the alternative forms of bearing construction described may be used with advantage in any of the applications of the bearing described.

Figures 9 and 10 show another arrangement wherein provision is made for the attachment of a spring to a chassis. In this construction the links 28—29 are attached in a similar manner to that previously described but the pivotal attachment of the links to the chassis is effected by forming the links as shown and rigidly connecting them to a bearing member or members of similar form to any of those described. The bearing member or members are journalled in a bracket 30 which is provided with lugs 31, 32 having holes 33, 34 for the purpose of bolting the bracket to the chassis.

Figure 11 shows a modified form of bearing, constructed according to the present invention, in which provision is made for adjustment in a direction parallel with the axis of the bearing. It will be apparent that in the construction shown in Figures 7 to 10 if the springs, to which this type of fitment is to be attached, vary slightly in width, it will be difficult to clamp the parts of the bearing together in a satisfactory manner. It is therefore desirable to construct the bearing as shown in Figure 11. This form of bearing can also be used with the other fitments described. The bearing members 35, 36 in this case are threaded with a sleeve 37 which is housed within a liner 38 threaded in the bore of the bearing. If desired, one bearing member may be threaded and the other made a sliding fit in the sleeve 37. Suitable apertures 39 may be provided in the sleeve in order to allow the lubricant from the reservoir to reach the bearing surface. An annular groove 40 may be formed on the interior of the sleeve 38 to serve as a further reservoir. The bearing surfaces may also be grooved so that the lubricant may be effectively distributed. The adjustment of the sleeve 38 and the bearing members 35, 36 may be effected by the provision of hexagonal projections 41, 42, respectively, formed on the bearing members.

If desired, provision may be made in the bearings described for the application of a lubricant from the exterior of the bearing. For example, a nipple may be provided on the bearing, in any convenient position, for the attachment of a grease gun, the nipple having access to the aforesaid reservoirs.

What I claim is:

1. A bearing for use in the attachment of a spring element to a vehicle element, the element to which the attachment is to be made having an eye, the said bearing comprising a pair of aligned bearing members rigidly attached to the eye of the vehicle element, a bolt coincident with the axis of said bearing members to effect their rigid attachment to the element, a connecting member provided with a bore in which the bearing members are journalled, and laterally extending flanges on each of the bearing members co-acting with the said connecting member to limit relative axial movement between the bearing members and said connecting member.

2. A bearing according to claim 1, wherein each bearing member is of hollow formation.

3. A bearing according to claim 1 wherein each bearing member is of hollow formation to provide a lubricant reservoir and means are provided to effect the passage of a lubricant from the reservoir to the peripheral surface of each bearing member.

4. A bearing according to claim 1 wherein each bearing member is threaded into a sleeve journalled within the connecting member.

5. A bearing according to claim 1 wherein each bearing is of hollow interior formation to provide a lubricant reservoir, each bearing member having a sleeve journaled within the connecting member, and means for effecting the passage of a lubricant from the interior of each bearing member to the peripheral surface of the sleeve.

6. A bearing according to claim 1 wherein each bearing member is threaded into a sleeve, and the connecting member has liners threaded into it and into which sleeves the bearing liners are journaled.

7. A bearing according to claim 1 wherein each bearing member is threaded into a sleeve journaled within the connecting member, and means for effecting the rotation of each bearing member relative to the sleeve with which it is in threaded engagement.

8. A bearing in accordance with claim 1 wherein the connecting member or liner in which each bearing member is journalled is provided with an annular groove forming a reservoir for a lubricant.

9. A bearing for use in the attachment of a spring element having an eye to a vehicle, the said bearing comprising a pair of aligned bearing elements rigidly connected to the eye of the element, means extending through the bearing members and the eye of the element to rigidly secure the parts together, each of the bearing members being of hollow form to provide a lubricant space, connecting members carried by the bearing members, the bearing members being circumferentially channeled to receive the ends of the connecting members, the channeled cooperation preventing leakage of the lubricant, the bearing members in line with the connecting member being formed with diametrically opposed openings to direct the lubricant from the interior of the bearing member to the connecting member, and means for connecting the opposite ends of the connecting members to the vehicle.

10. A bearing according to claim 1 wherein each flange is provided with an annular recess co-operating with a lip formed on each coacting surface of the connecting member.

11. A bearing for use in the attachment of a spring element formed with an eye to a vehicle, including independent bearing elements abutting the respective ends of the eye, a bolt passing through the bearing elements and through and spaced from the eye, and means arranged at the end of the bolt and cooperating therewith to secure the bearing elements in rigid fixed relation with the eye, connecting elements leading from the spring elements to the chassis of the vehicle, said connecting elements having terminal eye-like portions snugly seated in recesses formed in the peripheries of the bearing members, each bearing member being of hollow formation to form a lubricant receptacle, and formed with openings to admit passage of the lubricant to the inner surface of the eye-formed portions of the connecting members, the bearing members and spring eye moving as a unit in any compensation of spring action relative to the connecting members, and the lubricant receptacle of the bearing member being substantially completely inaccessible from the exterior of the connection.

ALFRED HENRY HILLIARD.